United States Patent
Mukai

[11] Patent Number: 5,903,073
[45] Date of Patent: May 11, 1999

[54] ELECTRIC ROTARY MACHINE HEAT CONDUCTIVE MEMBER

[75] Inventor: Takuzou Mukai, Handa, Japan

[73] Assignee: Denso Corporation, Aichi-ken, Japan

[21] Appl. No.: 08/908,920

[22] Filed: Aug. 8, 1997

[30] Foreign Application Priority Data

Aug. 9, 1996 [JP] Japan .................................. 8-210779

[51] Int. Cl.⁶ .............................. H02K 9/22; H02K 9/00
[52] U.S. Cl. .......................................................... 310/64
[58] Field of Search .............................. 310/64, 89, 260, 310/58, 59

[56] References Cited

FOREIGN PATENT DOCUMENTS

| | | |
|---|---|---|
| 596337 | 4/1934 | European Pat. Off. . |
| 89 15 212 | 12/1990 | European Pat. Off. . |
| 0 539 339 | 4/1993 | European Pat. Off. . |
| 2 037 829 | 2/1972 | Germany . |
| 3628093 | 4/1987 | Germany . |
| 56-156365 | 4/1955 | Japan . |
| 63-213464 | 9/1988 | Japan . |
| 1-166477 | 11/1989 | Japan . |
| 6-70508 | 3/1994 | Japan . |
| 7-177703 | 7/1995 | Japan . |

OTHER PUBLICATIONS

Patent Abstracts of Japan vol. 9, No. 147 (E–323) '1870!, Jun. 21, 1985 & JP 60 028750 A, Feb. 13, 1985.
Patent Abstracts of Japan vol. 013, No. 002 (E–700), Jan. 6, 1989 & JP 63 213464 A, Sep. 6, 1988.
Patent Abstracts of Japan vol. 096, No. 012, Dec. 26, 1996 & JP 08 223866 A, Aug. 30, 1996.

*Primary Examiner*—Clayton LaBalle
*Attorney, Agent, or Firm*—Pillsbury Madison & Sutro LLP

[57] ABSTRACT

To effectively cool down a stator coil generating a large amount of heat therein, a heat conductive member is disposed between a coil end and a metal frame in contact therewith. Heat generated in the stator coil is conducted to the heat conductive member and the heat conductive member is cooled down by cooling air from a cooling fan. Heat form the conductive member is also transferred to the metal frame, thereby the stator coil is further cooled. Even when the coil end cannot be cooled directly by the cooling air because the coil end is short, the coil end is effectively cooled by means of the conductive member. A corrugated fin made of a heat conductive metal plate such as an aluminum plate is preferably used as the heat conductive member. Fins formed on the metal frame may be also used as the heat conductive member. The heat conductive member may be disposed at both ends of the stator coil to enhance cooling effect.

12 Claims, 7 Drawing Sheets

ELECTRIC ROTARY MACHINE HEAT CONDUCTIVE MEMBER

CROSS-REFERENCE TO RELATED APPLICATION

This application is based upon and claims benefit of priority of Japanese Patent Application No. Hei-8-210779 filed on Aug.9, 1996, the content of which is incorporated herein by reference.

BACKGROUND OF THE INVENTION

1. Field of the Invention

The present invention relates to an electric rotary machine having cooling fins for cooling a stator coil, and more particularly to an alternator for use in an automotive vehicle in which cooling fins are disposed in contact with a stator coil to effectively cool down the stator coil.

2. Description of Related Art

An alternator which is a kind of an electric rotary machine that may be used in an automotive vehicle to generate electric power for charging a battery and supplying electric power to various electric devices such as lighting equipment, an ignition system and others. Recently, more electric power is being required for a vehicle because the number of electric devices including electronic control systems used in a vehicle is increasing, and a mounting space for the alternator is getting smaller. Therefore, it is required that the alternator generate high power with a compact size. High efficiency and compactness of the alternator is also required from a standpoint of fuel economy.

It is generally known that it is effective, for attaining a higher efficiency of an alternator, to reduce copper loss generated in a stator coil ($I^2R$, where I is stator current and R is resistance of the coil). Since the stator coil resistance is dependent on temperature of the coil and increases with temperature rise in the coil, the temperature rise in the coil has to be suppressed by cooling down the coil.

A conventional technology for cooling down the stator coil is disclosed, for example, in Japanese Patent Laid-Open Publication No. Hei-6-70508. An electric rotary machine disclosed in this publication has a metal ring attached to a coil end for cooling the coil by conducting heat generated in the coil to the metal ring and a housing. The metal ring is attached to the coil end by an adhesive tape and a filler material. Another conventional technology is disclosed in Japanese Utility Model Laid-Open Publication No. Hei-1-166477 and Japanese Patent Laid-Open Publication No. Sho-63-213464. A linear motor disclosed therein has a resin-molded coil on which a heat radiating fin is formed. The coil is cooled down by the radiating fin.

Since the coil of the electric rotary machine disclosed in the publication Hei-6-70508 is cooled down by heat conduction through the adhesive tape and the filling material, cooling efficiency is not high enough to apply this technology to a coil of an alternator for use in a vehicle generating continuously a large amount of heat. The coil of the linear motor disclosed in the publication Hei-1-166477 or Sho-63-213464 is cooled by natural radiation from the radiating fin formed on the resin-molded coil. Therefore, cooling efficiency is not high enough to apply the same technology to an alternator.

SUMMARY OF THE INVENTION

The present invention has been made in view of the above-mentioned problems, and an object of the present invention is to provide an electric rotary machine having a heat conductive member which is capable of effectively cooling down a stator coil generating a large amount of heat therein, and more particularly to provide an alternator for use in an automotive vehicle which is compact in size and has a high efficiency.

To attain the object mentioned above, a heat conductive member is disposed in contact with a stator coil end so that heat generated in the stator coil is conducted to the heat conductive member, and the heat conductive member is cooled down by cooling air flow generated by a cooling fan. In this way, the stator coil can be effectively cooled, and accordingly efficiency of an electric rotary machine can be improved. Further, the heat conductive member is disposed in contact with a stationary member such as a frame, made of aluminum, constituting a housing of the machine. The heat conductive member is cooled down not only by the cooling air flow from the cooling fan but also by heat conduction to the frame which is usually at a lower temperature than the stator coil. The heat conductive member can be easily positioned between the stator coil and the frame, especially when a recess for receiving the heat conductive member therein is provided on the frame.

It is preferable to dispose an insulation member between the stator coil and the heat conductive member made of heat conductive metal such as aluminum for securing electric insulation therebetween, in case an insulating layer of the stator coil is damaged by contact with the heat conductive member or by any other reasons. The insulation member may be an insulation layer coated on the surface of the heat conductive member, or a member prepared separately.

A preferable form of the heat conductive member is a fin which does not interfere with cooling air flow from a cooling fan. The fin may be a corrugated fin made of a heat conductive metal plate such as aluminum or copper, or fins formed on a frame or housing as a single body therewith. The corrugated fin may be manufactured by presswork and roll bending, so that many plane surfaces are connected with and turned at respective turning surfaces. When the corrugated fin is assembled to the machine, it is pushed toward the stator coil so that its contacting area increases due to some deformation of the turning surfaces. The corrugated fin is preferably disposed in the rotary machine so that the turning surfaces may align with and extend in the radial direction with respect to the rotational axis, that is, the plane surfaces of the corrugated fin are placed in parallel to the radial direction. In this way, resistance against cooling air flowing through the corrugated fin becomes smaller. This alignment of the corrugated fin is especially effective when a cooling fan blowing air in the radial direction is fixed to an axial end surface of the rotor.

It is also preferable to combine the heat conductive member with a rotor coil wound in a short-pitch lap winding which has a lower height of coil ends and lower electric resistance. Though it is difficult to cool the coil end by directly blowing cooling air thereto because of its lower height, heat of the coil is conducted to the conductive member contacting the coil end, and in turn the conductive member can be cooled down effectively by the cooling air. Also, in this case a space enough to install the conductive member is available because the height of the coil end is low.

Other objects and features of the present invention will become more readily apparent from a better understanding of the preferred embodiment described below with reference to the following drawings.

DETAILED DESCRIPTION OF THE PREFERRED EMBODIMENTS

Figure 1:
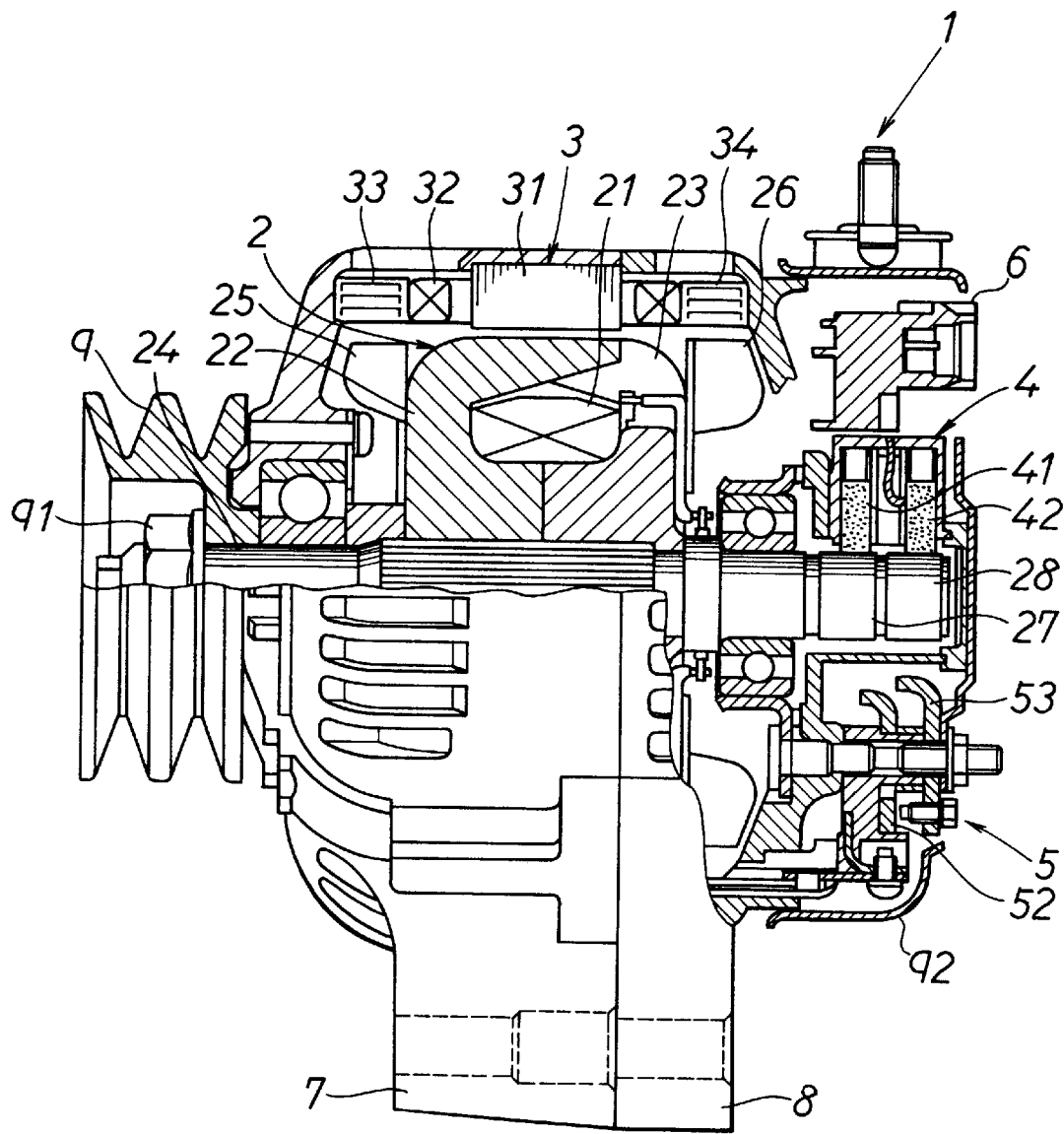
FIG. 1 is a drawing, partially cross-sectioned, showing a whole structure of an alternator of a first embodiment according to the present invention.

Referring to FIGS. 1–6B, a first embodiment of the present invention will be described. FIG. 1 shows a whole structure, partially cross-sectioned, of an alternator having cooling fans installed therein.

The alternator 1 is mainly composed of a rotor 2 rotatably supported in the alternator, a stator 3, a brush assembly 4, a rectifier 5, an IC regulator 6, a front-end frame 7, a rear-end frame 8, and a pulley 9. The rotor 2 is composed of a shaft 24; a pair of pole cores 22 and 23 each having six claws, fixedly mounted on the shaft 24; and a rotor coil 21 which has a cylindrical shape formed by coaxially winding insulated copper wire and held between the pair of pole cores 22 and 23. An axial-flow cooling fan 25 is mounted on the front-end surface (pulley side) of the pole core 22 by welding or any other suitable methods. The cooling fan 25 sucks in air from the front side (pulley side) into an inner space of the alternator and blows out the sucked air both axially and radially. Similarly, a centrifugal-flow cooling fan 26 is mounted on the rear-end surface of the pole core 23, and the fan 26 sucks in air from the rear side and blows it out radially. A pair of slip rings 27 and 28 are fixedly mounted on the shaft 24 at its rear end so that the slip rings slidably contact a pair of brushes 41 and 42 of the brush assembly 4 to supply excitation current to the rotor coil 21 from the rectifier 5.

The stator 3 consists of a stator core 31 with a plurality of slots (for example, 24) formed thereon and a stator coil 32 disposed in the slots and wound with three-phase in a certain winding fashion (for example short-pitch lap winding). A corrugated fin 33 as a heat conductive element is disposed, making one circle, between the front-end frame 7 and the front-end of the stator coil 32. In the same manner, another corrugated fin 34 is disposed, making one circle, between the rear-end frame 8 and the rear-end of the stator coil 32. Details of the corrugated fins 33 and 34 will be described later.

The rectifier 5 for rectifying three-phase alternating current from the stator coil 32 into direct current is composed of a terminal plate having wiring terminals, a positive heat sink 52 and a negative heat sink 53, each being disposed on each side of the terminal plate with a certain distance, and a plurality of rectifier elements soldered on the heat sinks 52 and 53. The IC regulator 6 controls current supply to the rotor coil 21 to keep an output voltage of the alternator 1 constant. The pulley 9 is fixed to the front-end of the shaft 24 by a nut 91 and driven by an engine. A rear cover 92 is disposed on the rear-end frame 8 to cover the brush assembly 4, the rectifier 5 and the IC regulator 6 therein.

The alternator 1 described above is driven by the engine. When the rotor 2 rotates in a predetermined direction and excitation current is supplied to the rotor coil 21, three-phase alternating current is generated in the stator coil 32 and rectified by the rectifier 5 into direct current output. Once the alternator becomes operational, the excitation current for the rotor coil 21 is directly supplied from the alternator itself through the IC regulator, and accordingly there is no need to supply the excitation current from outside.

The cooling fan 25 fixed to the front-end surface of the pole core 22 rotates together with the rotor 2. Air is sucked in from windows formed on the front-end frame 7 and flows through in both axial and radial directions. The axial air flow cools down the rotor coil 21 and the radial air flow cools down the corrugated fin 33 disposed between the stator coil 32 and the front-end frame 7. Accordingly, the stator coil 32 contacting the corrugated fin 33 is cooled down. The cooling fan 26 fixed to the other pole core 23 also rotates. Air is sucked in from windows made on the rear cover 92 and flows out radially from windows formed on the rear-end frame 8. The rectifier 5, the IC regulator 6 and the other corrugated fin 34 disposed between the stator coil 32 and the rear-end frame 8 are cooled down by this air flow. Thus, the stator coil 32 contacting the corrugated fin 34 is cooled down.

Figure 2:
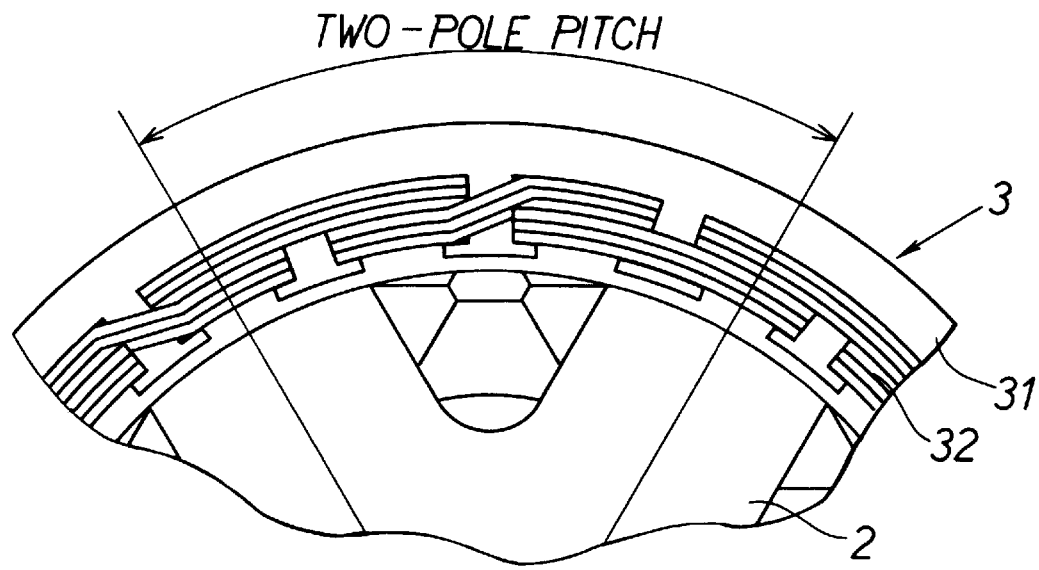
FIG. 2 is a drawing showing an example of a stator coil wound in short-pitch lap winding.

FIG. 2 shows an example of a stator coil winding structure, viewed from the front side (pulley side). This winding is generally known as a $(\frac{2}{3})\pi$ short-pitch lap winding having a winding pitch of $\frac{2}{3}$ pole-pitch. A coil resistance per one phase of this winding is two thirds of a full-pitch winding having a winding pitch of one pole-pitch. Therefore, copper loss ($I^2R$) in the coil 32 is reduced to two thirds, compared with that of full-pitch winding. Also, a height of the coil end sticking out from the stator core 31 is lower compared with that of full-pitch winding. Because the height of the coil end is low, cooling air blown by the cooling fans 25 and 26 does not directly hit the coil ends, resulting in insufficient cooling of the stator coil. Therefore, the corrugated fins 33 and 34 are disposed in the spaces saved by lowering the coil ends so that the cooling air hits the corrugated fins as shown in FIG. 1. The stator coil 32 contacting the corrugated fins 33 and 34 is cooled down by heat conduction from the coil 32 to the corrugated fins 33 and 34.

Figure 3:
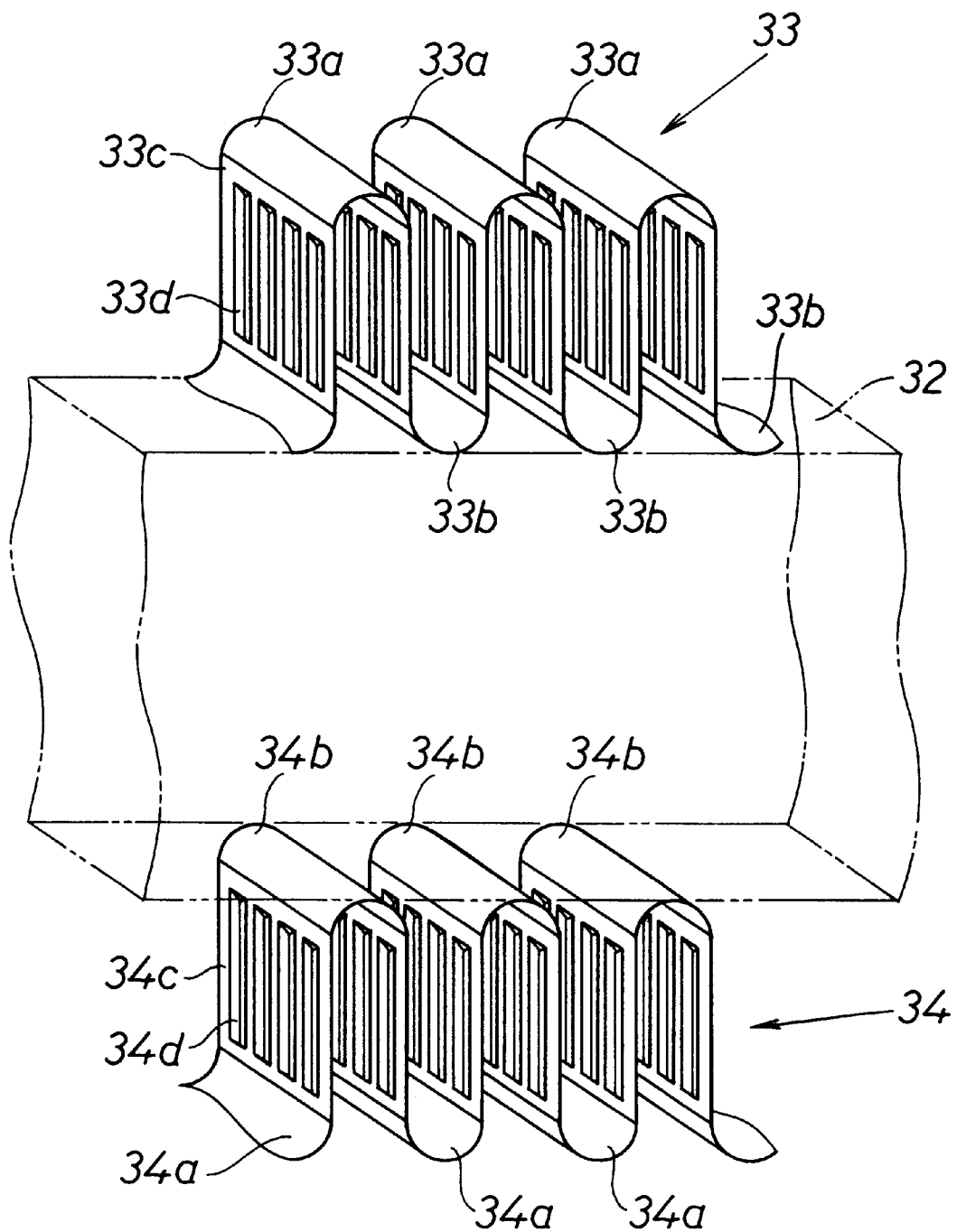
FIG. 3 is a perspective view showing corrugated fins to be attached to coil ends in the first embodiment.

FIG. 3 shows a detailed structure of the corrugated fins 33 and 34. The corrugated fins are made of a thin metal plate having a high heat conductivity such as an aluminum plate, and formed in a corrugated shape as shown in the drawing. Each corrugated fin is rounded to form a ring shape as shown in FIG. 5B and disposed in the space between the coil end and the frame. The corrugated fin 33 is composed of turning surfaces 33a which contact the front-end frame 7, other turning surfaces 33b which contact the front coil end of the stator coil 32 and plane surfaces 33c connecting both turning surfaces. Similarly, the other corrugated fin 34 is composed of turning surfaces 34a which contact the rear-end frame 8, other turning surfaces 34b which contact the rear coil end of the stator coil 32 and plane surfaces 34c connecting both turning surfaces. On the plane surfaces 33c and 34c, there are formed louvers 33d and 34d extending in a direction parallel to a rotational direction of the rotor 2. The corrugated fins 33 and 34 provide a plurality of heat radiating plates aligned in the radial direction in which the cooling air from the cooling fans 25 and 26 flows, thereby radiating the heat therefrom conducted from the stator coil 32 which is disposed in contact with the corrugated fins 33 and 34. In other words, the corrugated fins 33 and 34 form heat radiating members circularly disposed at both ends of the stator coil 32 in contact therewith.

The surfaces of the corrugated fins contacting the coil ends are treated to have insulation, so that the fins and coil ends are well insulated from each other even when insulating film of the coil is damaged. The insulation treatment on the fin surface may be made by forming a insulating film of resin such as polyimide (similar to insulation of stator coil), or by hardening insulating liquid coated on the fin surface. It is also possible to insert an insulating sheet between the fin and the coil end when assembled, without making any insulation treatment on the fin surface.

Figure 4:
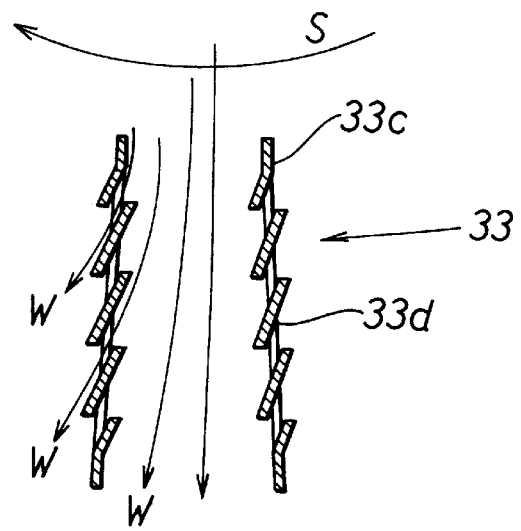
FIG. 4 is a schematic view showing air flow through louvers on a corrugated fin.

FIG. 4 is a cross-sectional view of the plane surface 33c, taken along a line perpendicular to the rotor axis, showing louvers 33d and directions of air flow. "S" is the rotational direction of the rotor 2, and "W" shows directions of radial cooling air flow generated mainly by the cooling fan 25 and partly by rotation of the rotor 2. The flow "W" which includes some component along the rotational direction "S" flows mostly in the radial direction and partly through spaces between the louvers 33d. A louver angle relative to the plane surface 33c is made not to interfere with the air flow component along the rotational direction. Thus, air flow resistance increase by louvers is made minimal and cooling efficiency is enhanced.

Figure 5A:
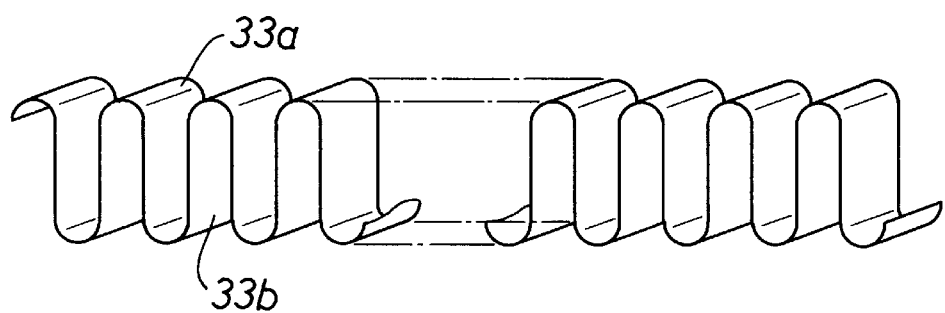
FIG. 5A is a perspective view showing an exemplary process for forming the corrugated fin.
Figure 5B:
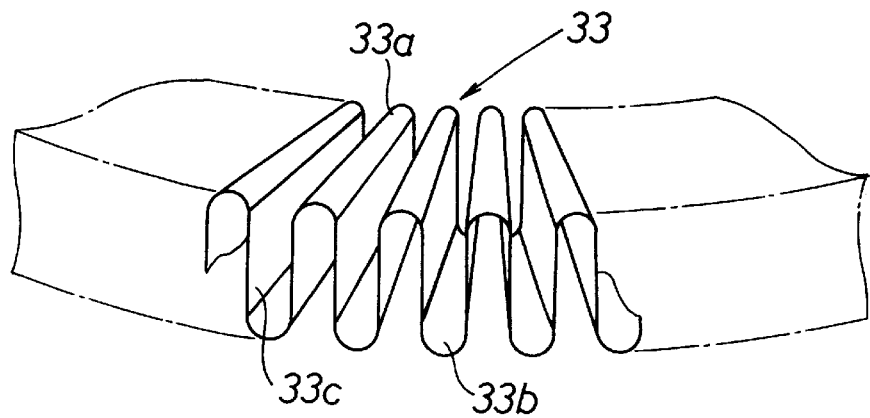
FIG. 5B is a perspective view showing a way of bending the corrugated fin.

FIGS. 5A and 5B show an exemplary process for manufacturing the corrugated fin from an aluminum strip plate having an insulating layer thereon. First, louvers 33d are formed on the strip plate by presswork, and then the strip plate is corrugated as shown in FIG. 5A by a roll process, and finally the corrugated strip plate is rounded into a ring shape as shown in FIG. 5B.

Figure 6A:
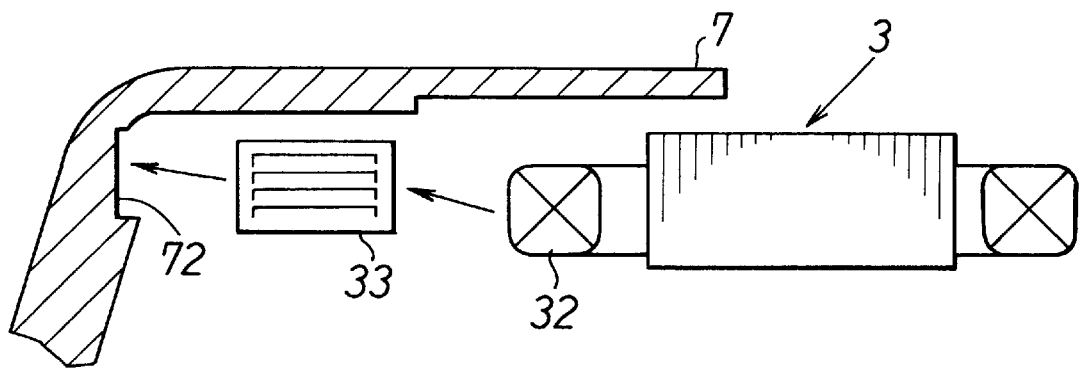
FIG. 6A is a cross-sectional view showing a way of assembling the corrugated fin to a front-end frame.

FIG. 6A shows a way of assembling the corrugated fin 33 in a space between the front-end frame 7 and the front coil end of the stator coil 32. On the front-end frame, a recess 72 for positioning the corrugated fin 33 therein and holding the same not to move radially is formed. The corrugated fin 33 is positioned in the recess 72 and then the stator 3 is assembled to push the corrugated fin 33 toward the front-end frame 7. The corrugated fin 33 is elastically held in the space between the front-end frame and the front coil end of the stator coil 32. Preferably, the turning surfaces 33a and 33b are deformed a little by pushing them toward the front-end frame 7, so that areas contacting the frame and coil end may increase and heat conduction is enhanced.

Figure 6B:
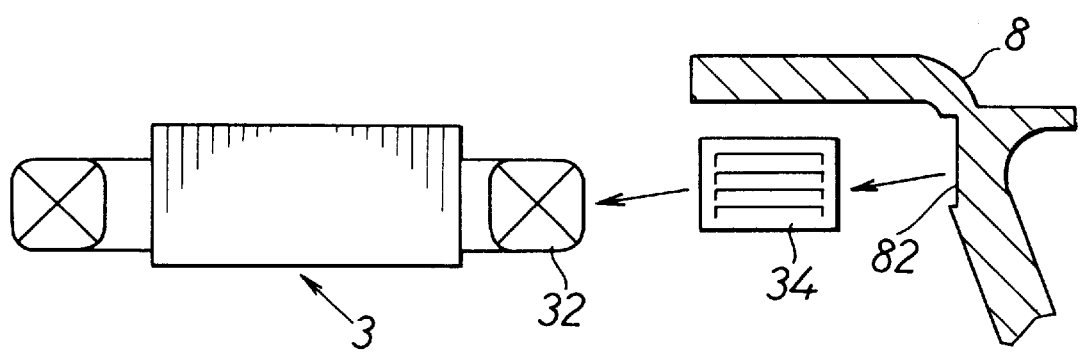
FIG. 6B is a cross-sectional view showing a way of assembling the corrugated fin to a rear-end frame.

Similarly, FIG. 6B shows a way of assembling the corrugated fin 34 in a space between the rear-end frame 8 and the rear coil end of the stator coil 32. There is made a recess 82 for positioning and holding the corrugated fin 34 on the rear-end frame 8. The corrugated fin 34 is held between the rear-end frame 8 and rear coil end of the stator coil 32 in the same manner as the corrugated fin 33.

In the alternator 1 having corrugated fins 33 and 34 contacting both ends of the stator coil 32, heat generated in the stator coil 32 is effectively conducted to the corrugated fins 33 and 34. The front corrugated fin 33 is cooled down by cooling air blown in a radial direction by the front cooling fan 25, and the rear corrugated fin 34 is cooled down by cooling air blown in a radial direction by the rear cooling fan 26. The corrugated fins 33 and 34 are further cooled by heat radiation from the louvers 33d and 34d formed on the plane surfaces 33c and 34c. In addition, the corrugated fins 33 and 34 are cooled down also by heat conduction to the end frames 7 and 8 which are made of a heat conductive material such as aluminum and have a lower temperature than the stator coil 32.

Even in the case where the coil ends of the stator coil 32 cannot be directly cooled by the cooling air from the fans due to a lower height of the coil ends of the stator coil 32 which is wound in a short-pitch lap winding, the stator coil 32 can be effectively cooled down through the corrugated fins contacting the stator coil 32. As the heat generated in the stator coil 32 wound in the short-pitch lap winding is originally low because of its low winding resistance, as mentioned above, temperature of the stator coil 32 can be further lowered by combining the corrugated fins therewith.

Because the surface of the corrugated fin is treated to have an electric insulation function and the stator coil itself has an insulating layer thereon, the stator coil 32 is well insulated from the end frames 7 and 8. Especially, as the round turning surfaces 33b and 34b having no edge portion contact the coil ends of the stator coil 32, as seen from FIG. 3, possibility of insulation damage is quite low. In the case the corrugated fin is made of aluminum plate, electric insulation can be stably kept, because the aluminum surface is only covered by an aluminum oxide which is an insulator itself even if the corrugated fin is oxidized during a long time usage. Also, as the plane surfaces 33c and 34c of the corrugated fins 33 and 34 are placed in a radial direction, air flow resistance against the radial cooling air can be made minimal.

Figure 7:
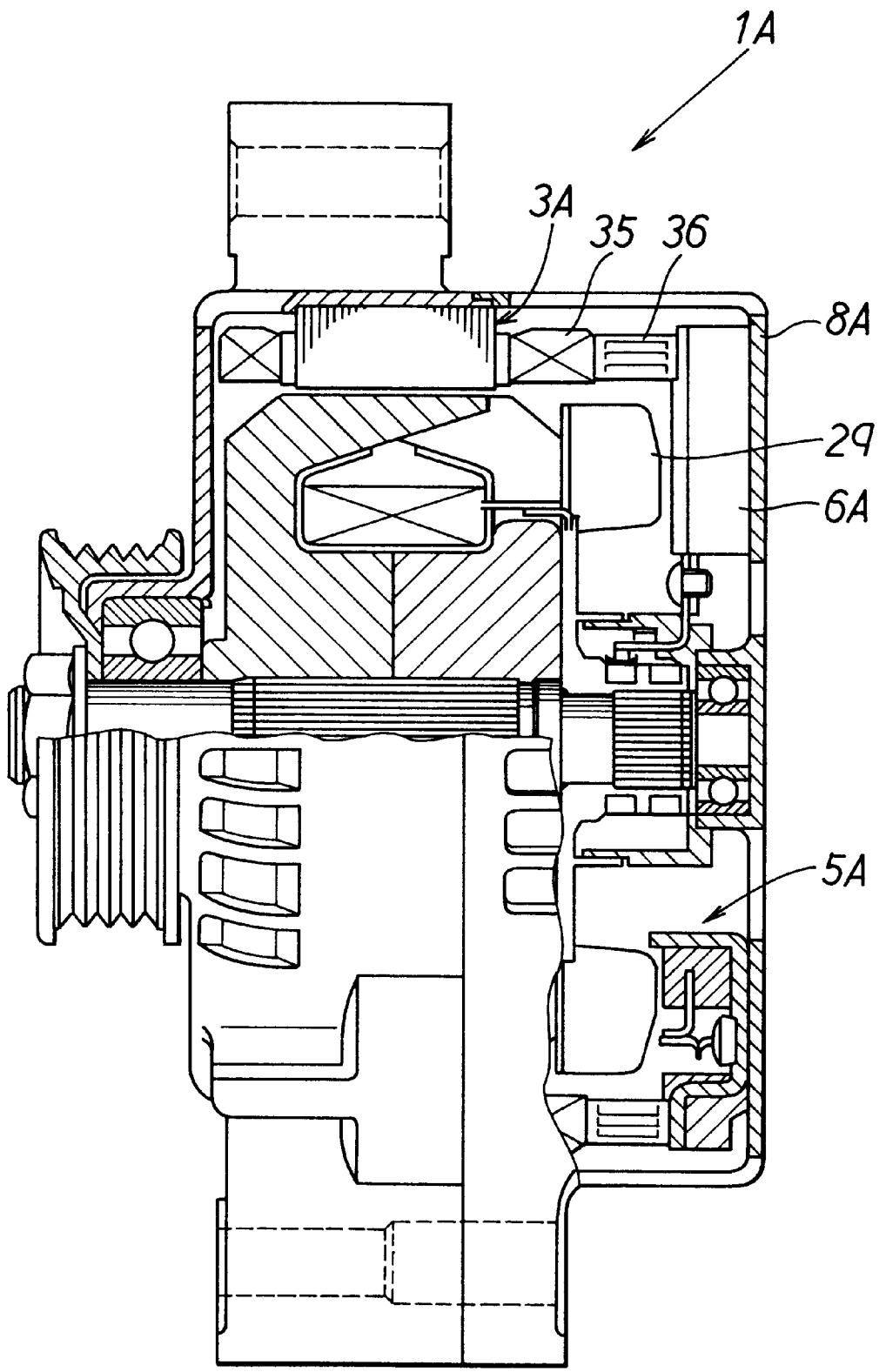
FIG. 7 is a drawing, partially cross-sectioned, showing a whole structure of an alternator of a second embodiment according to the present invention.

FIG. 7 shows a whole structure of an alternator 1A as a second embodiment according to the present invention. The alternator 1A of this embodiment has a different structure from the alternator 1 of the first embodiment. The alternator 1A includes a rectifier 5A and an IC regulator 6A within a rear-end frame 8A, as opposed to the alternator 1 of the first embodiment in which the rectifier 5 and the IC regulator 6 are mounted outside the rear-end frame 8 and covered by the rear cover 92. In the alternator structure of the second embodiment, it is not possible to dispose a corrugated fin between the stator coil and the rear-end frame. Therefore, a corrugated fin 36 is disposed between a stator coil 35 and components (an IC regulator 6A and a rectifier 5A) other than the rear frame 8A, as shown in FIG. 7.

In the same manner as in the first embodiment, heat generated in the stator coil 35 is conducted to the corrugated fin 36, and the corrugated fin 36 is cooled down by a radial flow of cooling air blown by a cooling fan 29. Also, heat of the corrugated fin 36 is conducted to the IC regulator 6A and the rectifier 5A which are at lower temperature than the stator coil 35.

Figure 8:
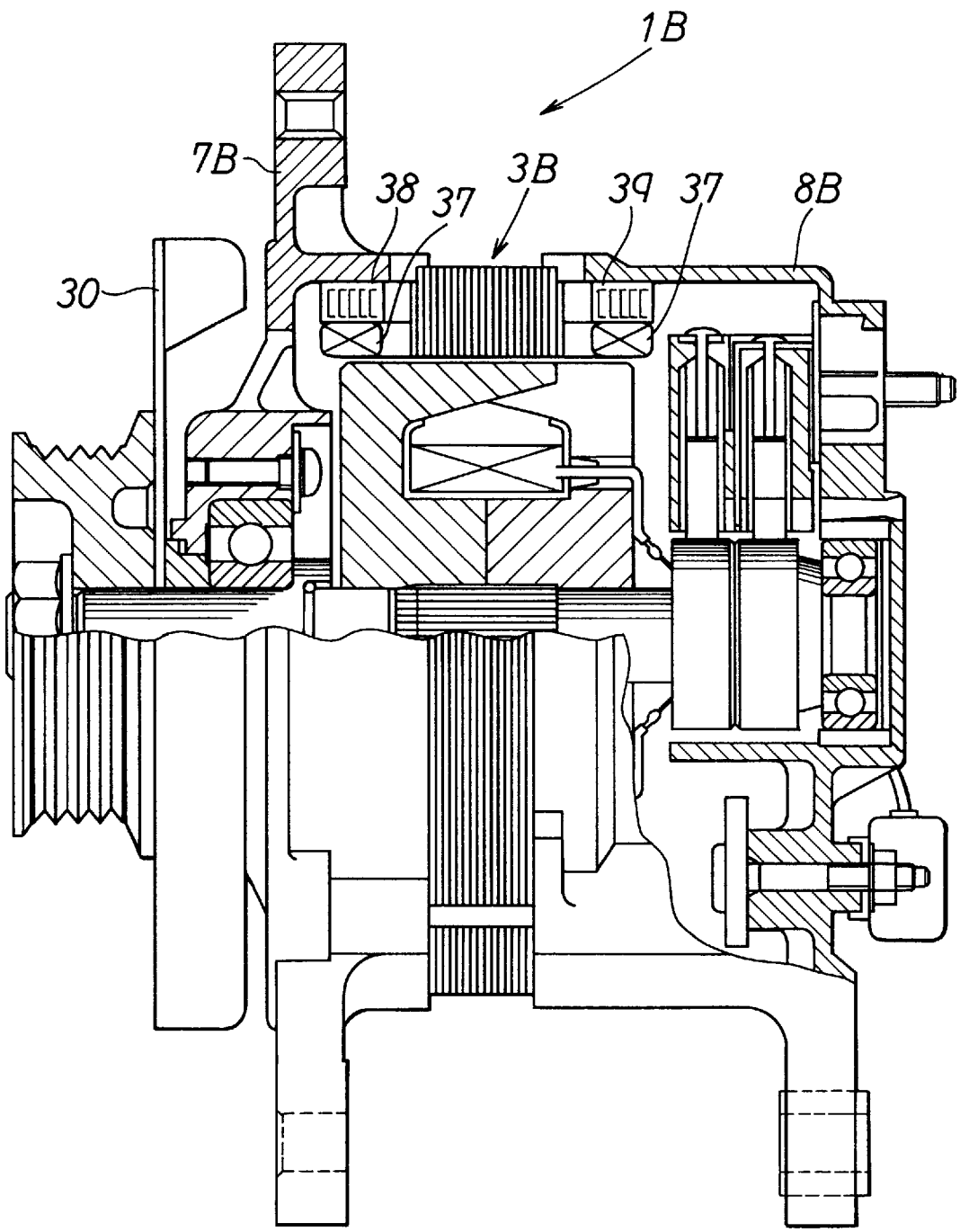
FIG. 8 is a drawing, partially cross-sectioned, showing a whole structure of an alternator of a third embodiment according to the present invention.
Figure 9:
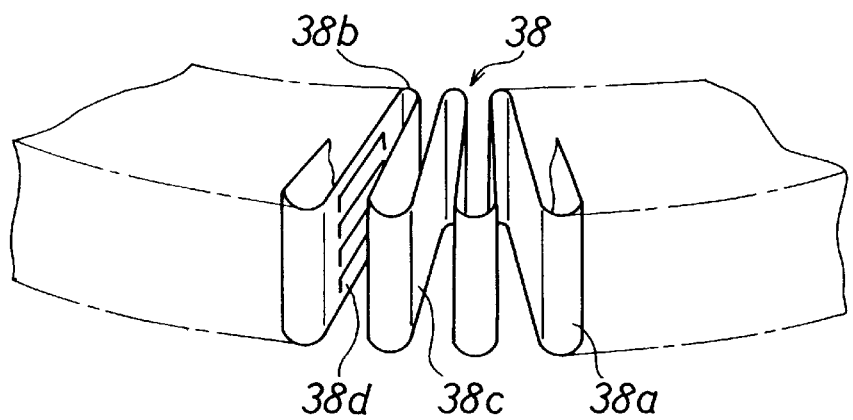
FIG. 9 is a perspective view showing a corrugated fin used in the third embodiment.

Referring to FIGS. 8 and 9, a third embodiment according to the present invention will be described. FIG. 8 shows a whole structure of an alternator 1B in which a cooling fan 30 is installed outside a front-end frame 7B, as opposed to the alternators described above in which a fan (or fans) is installed inside the frame. The cooling fan 30 sucks in air from windows formed on a rear-end frame 8B and a cylindrical portion of the front-end frame 7B into an inner space of the alternator 1B, and blows out the sucked air in a radial direction from windows formed on an axial end of the front-end frame 7B. A front corrugated fin 38 and a rear corrugated fin 39 are disposed in a peripheral space between an outer surface of the stator coil 37 and an inner surface of the front-end frame 7B and the rear-end frame 8B. Heat generated in the stator coil 39 is conducted to the corrugated fins 38 and 39 which are cooled down by the cooling air flowing therethrough, in the same manner as in the first and the second embodiments.

Because the cooling air in this embodiment flows in the axial direction in the inner space, as opposed to the foregoing embodiments, the corrugated fins 38 and 39 have to be placed differently not to interfere with the cooling air flow. As shown in FIG. 9, the corrugated fin 38 is rounded so that turning surfaces 38a contacting the inner surface of the front-end frame 7B become outside and turning surfaces 38b contacting the outer periphery of the stator coil 37 become inside. When the corrugated fin 38 thus made is disposed in the peripheral space between the stator coil 37 and the front-end frame 7B, plane surfaces 38c are placed in parallel to the direction of the cooling air flow, i.e., in the axial direction. Louvers 38d are formed on the plane surfaces 38c in the same manner as in the other embodiments. The rear corrugated fin 39 is made in the same manner as the front corrugated fin 38 and disposed in the alternator similarly.

Figure 10:
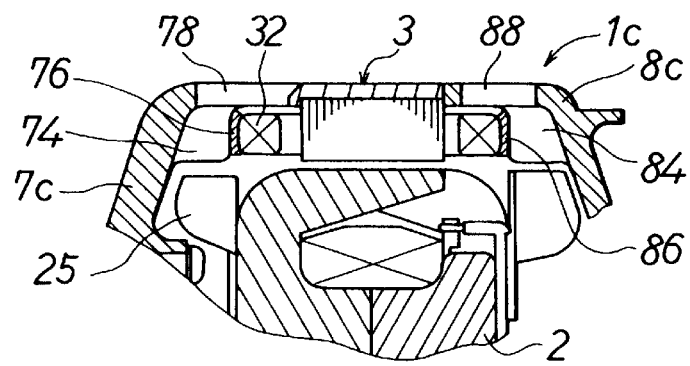
FIG. 10 is a fragmentary cross-sectional view showing a fourth embodiment according to the present invention.
Figure 11:
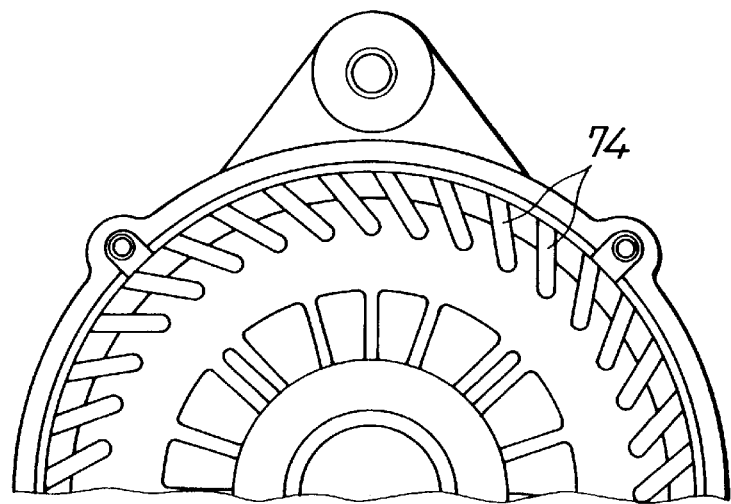
FIG. 11 is a plan view showing a drive-end frame used in the fourth embodiment, viewed from the inside of the same.

Referring to FIGS. 10 and 11, a fourth embodiment according to the present invention will be described. FIG. 10 is a partial cross-sectional view of an alternator 1C showing a structure of cooling fins 74 and 84 and a stator coil 34. FIG. 11 shows cooling fins 74 formed on a front-end frame 7C viewed from the inside of the alternator 1C. In this embodiment, cooling fins 74 are formed on the front-end frame 7C and fins 84 are similarly formed on a rear-end frame 8C. These fins are used as heat conductors in place of the corrugated fins used in the first, second and third embodiments.

The fins 74 are formed on the front-end frame as a single body therewith and located on the frame not to close air outlet windows 78. As shown in FIG. 11, fins 74 are formed with a certain slanted angle toward the rotational direction of the rotor 2, so that a cooling air flow component along the rotational direction which is included in the radial cooling air flow generated by a cooling fan 25 may flow smoothly with less resistance. The cooling fins 74 contact a front coil end of the stator coil 32 via an electric insulator 74 having a high heat conductivity. The insulator 76 may be made of a thin insulating sheet cut into a ring shape, or an insulating material which is coated on the fins and cured, or any other material which is suitable for the purpose. In the same manner as cooling fins 74, the cooling fins 84 are formed on the rear-end frame 8C not to close air outlet windows 88, and contact a rear coil end of the stator coil 32 via an insulator 84.

Heat generated in the stator coil 32 is conducted to the cooling fins 74 and 84, and these fins are cooled down by the cooling air blown by the fans 25 in the radial direction. Also, the stator coil 32 is cooled by heat conduction to the frames 7C and 8C through the fins 74 and 84, since the frames are generally at lower temperature than the stator coil 32.

The corrugated fins used in the first, second and third embodiments may be made of any other suitable material than aluminum described above. For example, a copper plate having an insulating layer thereon may be used. Also, the corrugated fins may be manufactured by other processes than the process described above in FIGS. 5A and 5B. For example, the fins may be manufactured by directly corrugating a thin metal plate ring having a certain axial width. Though the corrugated fins which have louvers formed on the plane surfaces are described above, the louvers may not be necessarily formed. The stator coil winding is not limited to the short-pitch lap winding as described above but it may be other windings including a full-pitch winding. Present invention may be applied to various forms of the stator winding.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electric rotary machine comprising:
   a rotor;
   a stator having a stator coil thereon;
   a cooling fan which rotates together with the rotor;
   a frame holding the stator therein; and
   a heat conductive member for dissipating heat generated in the stator coil, said heat conductive member being (1) disposed in contact with the stator coil and the frame and (2) having a wave-shaped cross-section in a plane perpendicular to a direction of a cooling air flow generated by the cooling fan.

2. An electric rotary machine according to claim 1, wherein an electric insulation member is disposed between the stator coil and the heat conductive member.

3. An electric rotary machine according to claim 1, wherein the frame includes a recess for positioning the heat conductive member thereon.

4. An electric rotary machine according to claim 1, wherein the heat conductive member is cooling fins formed on the frame integrally therewith.

5. An electric rotary machine according to claim 1, wherein, the heat conductive member is made in contact with the stator coil by forcibly pushing the heat conductive member toward the stator coil so that a contacting area is enlarged.

6. An electric rotary machine according to claims 1, 2, 3 or 5, wherein the heat conductive member is a corrugated fin having a plurality of plane surfaces and a plurality of turning surfaces connecting the plane surfaces.

7. An electric rotary machine according to claim 6, wherein the corrugated fin is disposed in the electric rotary machine so that the turning surfaces of the corrugated fin extend in a direction substantially in parallel to a radial direction with respect to a rotational axis of the electric rotary machine.

8. An electric rotary machine according to claim 7, wherein the cooling fan is fixed to an axial end surface of the rotor and blows cooling air in its radial direction for cooling the corrugated fin.

9. An electric rotary machine according to claim 1, wherein the heat conductive member is disposed between an outer peripheral surface of the stator coil and an inner peripheral surface of the frame so that the conductive member encircles the stator coil.

10. An electric rotary machine comprising:
- a rotor;
- a stator having a stator coil thereon;
- a cooling fan which rotates together with the rotor;
- a frame holding the stator therein;
- a stationary member mounted on said frame; and
- a heat conductive member for dissipating heat generated in the stator coil, said heat conductive member being (1) disposed in contact with the stator coil and the stationary member and (2) having a wave-shaped cross-section in a plane perpendicular to a direction of a cooling air flow generated by the cooling fan.

11. An electric rotary machine according to claim 10, wherein an electric insulation member is disposed between the stator coil and the heat conductive member.

12. An electric rotary machine according to claim 10 or 11 wherein the heat conductive member is a corrugated fin having a plurality of plane surfaces and a plurality of turning surfaces connecting the plane surfaces.

* * * * *

UNITED STATES PATENT AND TRADEMARK OFFICE
CERTIFICATE OF CORRECTION

PATENT NO.     : 5,903,073
DATED          : May 11, 1999
INVENTOR(S)    : MUKAI, Takuzou It is certified that error appears in the above-identified patent and that said Letters Patent is hereby corrected as shown below:

On the title page item [54], should read --

ELECTRIC ROTARY MACHINE HAVING HEAT CONDUCTIVE MEMBER

--.

Signed and Sealed this

Ninth Day of November, 1999

Attest:

Q. TODD DICKINSON

Attesting Officer

Acting Commissioner of Patents and Trademarks